United States Patent
Ward

Patent Number: 5,963,530
Date of Patent: Oct. 5, 1999

[54] CD RECORDING DEVICE WITH AUXILLARY INPUT

[76] Inventor: Vera Ward, 805 Industrial Ave. #24, Inglewood, Calif. 90302

[21] Appl. No.: 08/970,020

[22] Filed: Nov. 13, 1997

[51] Int. Cl.$^6$ ........................................................ G11B 7/00
[52] U.S. Cl. ................................................ 369/84; 369/58
[58] Field of Search .................................. 369/2, 84, 30, 369/34, 36, 38, 85, 58, 83, 47, 48, 54, 59; 360/13, 15

[56] References Cited

U.S. PATENT DOCUMENTS

| | | | |
|---|---|---|---|
| 4,823,333 | 4/1989 | Satoh et al. | 369/84 |
| 5,414,688 | 5/1995 | Inokuchi | 369/84 |
| 5,610,893 | 3/1997 | Saga et al. | 369/84 |
| 5,732,059 | 3/1998 | Katsuyama | 369/84 |
| 5,790,498 | 8/1998 | Jeong | 369/84 |

*Primary Examiner*—Ali Neyzari

[57] ABSTRACT

A device for recording onto a compact disc signals received from another compact disc is provided including a compact disc player adapted to removably receive a compact disc via a first slot formed in the housing and play the same. Further included is a compact disc recorder adapted to receive a compact disc via a second slot formed in the housing. In use, the compact disc recorder is adapted to record processed audio signals onto the compact disc upon the receipt thereof. An auxiliary output is provided for being releasably connected to an amplified sound system for audibly transmitting the audio signals. Next included is a display for depicting a plurality of alphanumeric characters. A magnetic storage disk is provided for digitally storing a plurality of audio signals. An analog to digital converter is included to sample audio signals received in analog form and transmit said audio signals in digital form at an output thereof. It should be noted that the analog to digital converter is in communication with the compact disc player for receiving audio signals therefrom. Finally, a computer control mechanism, in a first mode, is adapted to transmit the audio signals received from the analog to digital converter to the auxiliary output for audible transmission thereof. In a second mode, the computer control mechanism transmits the audio signals to the magnetic storage disk for storage whereafter the stored audio signals are processed and transmitted to the compact disc recorder. The computer control mechanism further serves to depict on the display a current track, playback time, and record time.

1 Claim, 2 Drawing Sheets

CD RECORDING DEVICE WITH AUXILIARY INPUT

BACKGROUND OF THE INVENTION

1. Field of the Invention

The present invention relates to compact discs and more particularly pertains to a new cd recording device for recording onto a compact disc signals received from another compact disc.

2. Description of the Prior Art

The use of compact discs is known in the prior art. More specifically, compact discs heretofore devised and utilized are known to consist basically of familiar, expected and obvious structural configurations, notwithstanding the myriad of designs encompassed by the crowded prior art which have been developed for the fulfillment of countless objectives and requirements.

Known prior art compact discs include U.S. Pat. No. 5,434,838; U.S. Pat. No. 5,003,527; U.S. Pat. No. 5,060,221; U.S. Pat. No. 4,821,250; U.S. Pat. No. 5,446,857; and U.S. Pat. No. Des. 341,590.

In these respects, the cd recording device according to the present invention substantially departs from the conventional concepts and designs of the prior art, and in so doing provides an apparatus primarily developed for the purpose of recording onto a compact disc signals received from another compact disc.

SUMMARY OF THE INVENTION

In view of the foregoing disadvantages inherent in the known types of compact discs now present in the prior art, the present invention provides a new cd recording device construction wherein the same can be utilized for recording onto a compact disc signals received from another compact disc.

The general purpose of the present invention, which will be described subsequently in greater detail, is to provide a new cd recording device apparatus and method which has many of the advantages of the compact discs mentioned heretofore and many novel features that result in a new cd recording device which is not anticipated, rendered obvious, suggested, or even implied by any of the prior art compact discs, either alone or in any combination thereof.

To attain this, the present invention generally comprises a housing having a rectilinear configuration. As shown in FIG. 1, the housing includes a top face, a bottom face, a rear face, a front face, and a pair of side faces coupled therebetween defining an interior space. Situated within the housing is a compact disc player adapted to removably receive a compact disc via a first slot formed in the front face of the housing and play the same. Associated therewith is a compact disc recorder adapted to receive a compact disc via a second slot formed in the front face of the housing below the first slot. During use, the compact disc recorder functions to record processed audio signals onto the compact disc upon the receipt thereof. Further provided is an auxiliary input situated on the housing for releasably connecting with an auxiliary source of audio signals. A multiplexer is provided having a first input connected to the compact disc player and a second input connected to the auxiliary input. The multiplexer serves to transmit audio signals from the first input to an output of the multiplexer upon the receipt of a first control signal. When a second control signal is received, the multiplexer is adapted to transmit audio signals from the second input to the output of the multiplexer. Further provided is an auxiliary output for being releasably connected to an amplified sound system adapted to audibly transmit audio signals upon the receipt thereof. A display is positioned on the front face of the housing for displaying a plurality of alphanumeric characters. For digitally storing a plurality of audio signals, a magnetic storage disk is provided. An analog to digital converter is adapted to sample audio signals received in analog form and transmit said audio signals in digital form at an output thereof. The analog to digital converter is connected to the output of the multiplexer for receiving audio signals therefrom. Computer control means is connected to the compact disc player, magnetic storage disk, compact disc recorder, display, auxiliary output, and analog to digital converter. During use, the computer control means serves to allow the user-controlled transmission of the first and second control signals to the multiplexer. In a first mode, the computer control means is further adapted to transmit the audio signals received from the analog to digital converter to the auxiliary output for audible transmission thereof. In a second mode, the computer control mans transmits the audio signals to the magnetic storage disk for storage whereafter the stored audio signals are processed and transmitted to the compact disc recorder. The computer control means also depicts on the display a current track, playback time, and record time.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new cd recording device apparatus and method which has many of the advantages of the compact discs mentioned heretofore and many novel features that result in a new cd recording device which is not anticipated, rendered obvious, suggested, or even implied by any of the prior art compact discs, either alone or in any combination thereof.

It is another object of the present invention to provide a new cd recording device which may be easily and efficiently manufactured and marketed.

It is a further object of the present invention to provide a new cd recording device which is of a durable and reliable construction.

An even further object of the present invention is to provide a new cd recording device which is susceptible of a low cost of manufacture with regard to both materials and labor, and which accordingly is then susceptible of low prices of sale to the consuming public, thereby making such cd recording device economically available to the buying public.

Still yet another object of the present invention is to provide a new cd recording device which provides in the apparatuses and methods of the prior art some of the advantages thereof, while simultaneously overcoming some of the disadvantages normally associated therewith.

Still another object of the present invention is to provide a new cd recording device for recording onto a compact disc signals received from another compact disc.

Even still another object of the present invention is to provide a new cd recording device that includes a compact disc player adapted to removably receive a compact disc via a first slot formed in the housing and play the same. Further included is a compact disc recorder adapted to receive a compact disc via a second slot formed in the housing. In use, the compact disc recorder is adapted to record processed audio signals onto the compact disc upon the receipt thereof. An auxiliary output is provided for being releasably connected to an amplified sound system for audibly transmitting the audio signals. Next included is a display for depicting a plurality of alphanumeric characters. A magnetic storage disk is provided for digitally storing a plurality of audio signals. An analog to digital converter is included to sample audio signals received in analog form and transmit said audio signals in digital form at an output thereof. It should be noted that the analog to digital converter is in communication with the compact disc player for receiving audio signals therefrom. Finally, a computer control mechanism, in a first mode, is adapted to transmit the audio signals received from the analog to digital converter to the auxiliary output for audible transmission thereof. In a second mode, the computer control mechanism transmits the audio signals to the magnetic storage disk for storage whereafter the stored audio signals are processed and transmitted to the compact disc recorder. The computer control mechanism further serves to depict on the display a current track, playback time, and record time.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
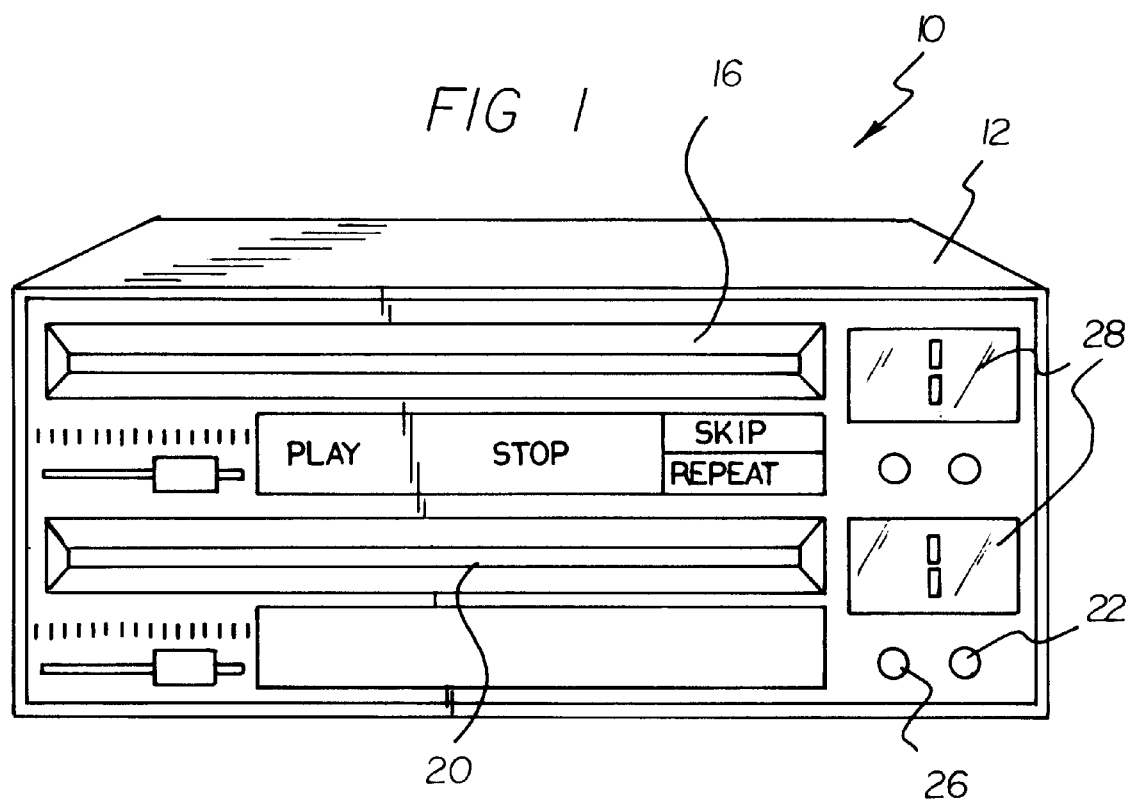
FIG. 1 is a front view of a new cd recording device according to the present invention.
Figure 2:
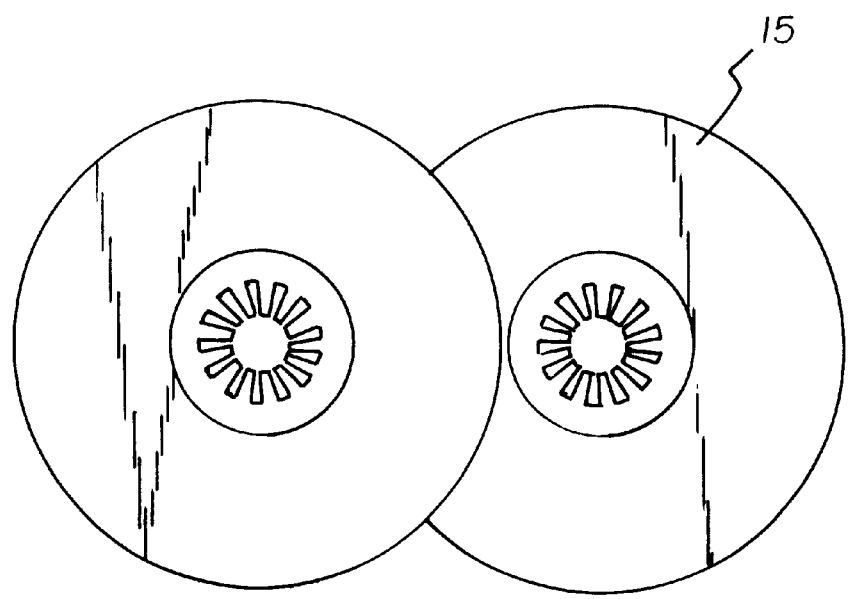
FIG. 2 is a rear view of the compact discs of the present invention.
Figure 3:
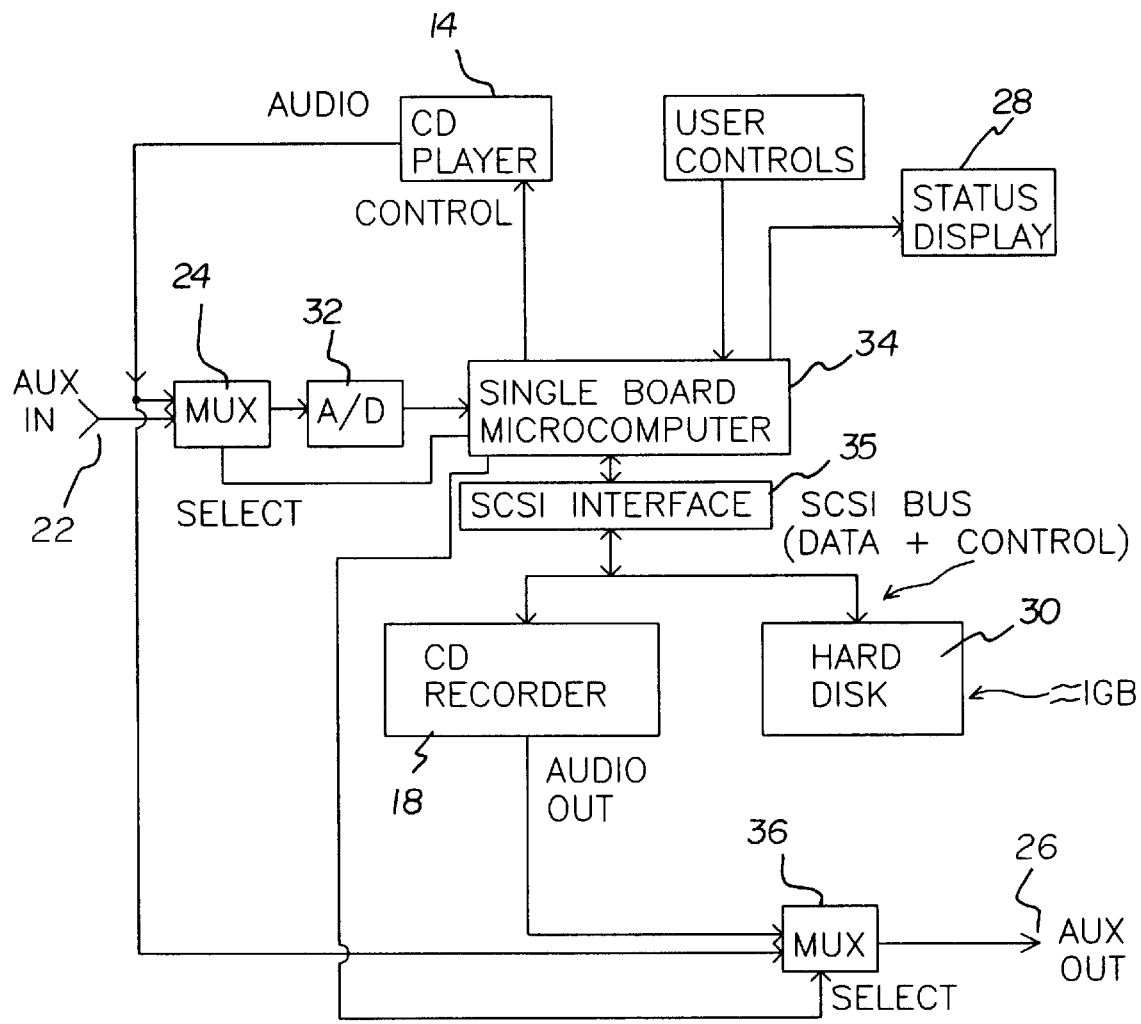
FIG. 3 is a schematic diagram of the interconnection of the various electrical components of the present invention.

With reference now to the drawings, and in particular to FIGS. 1 through 3 thereof, a new cd recording device embodying the principles and concepts of the present invention and generally designated by the reference numeral 10 will be described.

The system designated as numeral 10 includes a housing 12 having a rectilinear configuration. As shown in FIG. 1, the housing includes a top face, a bottom face, a rear face, a front face, and a pair of side faces coupled therebetween defining an interior space.

Situated within the housing is a compact disc player 14 adapted to removably receive a compact disc 15 via a first slot 16 formed in the front face of the housing and play the same. Associated therewith is a compact disc recorder 18 adapted to receive a compact disc via a second slot 20 formed in the front face of the housing below the first slot. During use, the compact disc recorder functions to record processed audio signals onto the compact disc.

Further provided is an auxiliary input 22 situated on the housing for releasably connecting with an auxiliary source of audio signals. Such input is thus adapted to receive signals from a tape player, radio or the like. A multiplexer 24 is provided having a first input connected to the compact disc player and a second input connected to the auxiliary input. The multiplexer serves to transmit audio signals from the first input to an output of the multiplexer upon the receipt of a first control signal. When a second control signal is received, the multiplexer is adapted to transmit audio signals from the second input to the output thereof.

Further provided is an auxiliary output 26 for being releasably connected to an amplified sound system adapted to audibly transmit audio signals upon the receipt thereof. A display 28 is positioned on the front face of the housing for displaying a plurality of alphanumeric characters.

For digitally storing a plurality of audio signals, a magnetic storage disk 30 is provided. Such disk is ideally similar to those employed in the art of personal computers and the like.

An analog to digital converter 32 is provided which is adapted to sample audio signals received in analog form and transmit said audio signals in digital form at an output thereof. The analog to digital converter is connected to the output of the multiplexer 24 for receiving audio signals therefrom.

Computer control means 34 is connected to the compact disc player, magnetic storage disk, compact disc recorder, display, auxiliary output, and analog to digital converter. During use, the computer control means serves to allow the user-controlled transmission of the first and second control signals to the multiplexer. As such, a user may selectively determine from which source audio signals are received.

In a first mode, the computer control means is adapted to transmit the audio signals received from the analog to digital converter to the auxiliary output for the audible transmission thereof. As such, the present invention operates as a compact disc playback mechanism in the first mode of operation. To facilitate the governing of operation of the present invention while in the first mode, play, stop, skip and repeat buttons are provided. In a second mode, the computer control means transmits the received audio signals to the magnetic storage disk for storage whereafter the stored audio signals are processed and transmitted to the compact disc recorder. It should be noted that such order is critical since lengthy processing is required to arrange the received audio signals in the ISO9660 format. Such processing is accomplished by the use of software available from various manufactures including Pinnacle Micro, Kodak, and JVC. To accomplish the required transfer of the digital audio signals between the hard drive and recorder for processing, a SCSI interface 35 is connected therebetween.

In the second mode of operation, the computer control means allows the transmission of the audio signals to the auxiliary output during both the storage of the audio signals on the disk and further the recording thereof via the compact disc recorder. To control the source of audio signals being transmitted to the auxiliary output, a second multiplexer 36 is provided. Inputs of the second multiplexer are connected to both the compact disc recorder and player.

In both modes of operation, the computer control means depicts on the display a current track, playback time, and record time. Various user controls are further included for accomplishing additional functions including adjusting the level of recording and playback. Ideally, an earphone jack is also included for allowing the use of a headset to listen to the audio signals received from the second multiplexer.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A device for recording onto a compact disc signals received from another compact disc comprising, in combination:

a housing having a rectilinear configuration including a top face, a bottom face, a rear face, a front face, and a pair of side faces coupled therebetween defining an interior space;

a compact disc player adapted to removably receive a compact disc via a first slot formed in the front face of the housing and play the same;

a compact disc recorder adapted to receive a compact disc via a second slot formed in the front face of the housing below the first slot, the compact disc recorder further adapted to record processed audio signals onto the compact disc upon the receipt thereof;

an auxiliary input situated on the housing for releasably connecting with an auxiliary source of audio signals;

a first multiplexer having a first input connected to the compact disc player and a second input connected to the auxiliary input, the first multiplexer serving to transmit audio signals from the first input to an output of the first multiplexer upon the receipt of a first control signal and further transmit audio signals from the second input to the output of the first multiplexer upon the receipt of a second control signal;

an auxiliary output for being releasably connected to an amplified sound system adapted to audibly transmit audio signals upon the receipt thereof;

a display positioned on the front face of the housing for displaying a plurality of alphanumeric characters;

a magnetic storage disk for digitally storing a plurality of audio signals;

an analog to digital converter adapted to sample audio signals received in analog form and transmit said audio signals in digital form at an output thereof, the analog to digital converter connected to the output of the multiplexer for receiving audio signals therefrom;

computer control means connected to the compact disc player, magnetic storage disk, compact disc recorder, display, auxiliary output, first multiplexer, and analog to digital converter, the computer control means serving to allow the user-controlled transmission of the first and second control signals to the first multiplexer, the computer control means, in a first mode, further adapted to transmit the audio signals received from the analog to digital converter to the auxiliary output for audible transmission thereof and, in a second mode, adapted to transmit the audio signals to the magnetic storage disk for storage thereby accommodating lengthy time required for processing whereafter the stored audio signals are processed and transmitted to the compact disc recorder, wherein the computer control means is further adapted to depict on the display a current track, playback time, and record time;

play button, a stop button, a skip button, and a repeat button mounted on the housing between the first slot and the second slot for facilitating use of the compact disc player during operation in the first mode; and a second multiplexer connected between the auxiliary output and the outputs of the compact disc player and the compact disc recorder for controlling the transmission of audio signals to the auxiliary output.

\* \* \* \* \*